US011710865B2

(12) United States Patent
Grzywok et al.

(10) Patent No.: US 11,710,865 B2
(45) Date of Patent: Jul. 25, 2023

(54) CONNECTOR FOR CONNECTING CELLULAR ELECTRICAL ELEMENTS AND METHOD FOR INSTALLING SUCH A CONNECTOR ON A BATTERY UNIT

(71) Applicant: TE Connectivity Germany GmbH, Bensheim (DE)

(72) Inventors: Wilhelm Grzywok, Munich (DE); Andre Martin Dressel, Lampertheim (DE); Uwe Hauck, Kleinmachnow (DE)

(73) Assignee: TE Connectivity Germany GmbH, Bensheim (DE)

( * ) Notice: Subject to any disclaimer, the term of this patent is extended or adjusted under 35 U.S.C. 154(b) by 537 days.

(21) Appl. No.: 15/272,573

(22) Filed: Sep. 22, 2016

(65) Prior Publication Data

US 2017/0012269 A1 Jan. 12, 2017

Related U.S. Application Data

(63) Continuation of application No. PCT/EP2015/055743, filed on Mar. 19, 2015.

(30) Foreign Application Priority Data

Mar. 24, 2014 (DE) .................... 10 2014 205 465.6

(51) Int. Cl.
*H01M 10/00* (2006.01)
*H01M 10/48* (2006.01)
(Continued)

(52) U.S. Cl.
CPC ....... *H01M 10/482* (2013.01); *H01M 50/209* (2021.01); *H01M 50/227* (2021.01);
(Continued)

(58) Field of Classification Search
CPC .. H01M 2/206; H01M 2/1077; H01M 2/1094; H01M 10/482; H01M 2220/20
See application file for complete search history.

(56) References Cited

U.S. PATENT DOCUMENTS

2006/0026822 A1\* 2/2006 Seman .................. H01M 2/204
29/623.4
2012/0019061 A1 1/2012 Nishihara et al.
(Continued)

FOREIGN PATENT DOCUMENTS

CN 102804452 A 11/2012
CN 103094499 A 5/2013
(Continued)

OTHER PUBLICATIONS

2014 English Abstract for CN 203674293 Jun. 25, 2014.\*
(Continued)

*Primary Examiner* — Cynthia H Kelly
*Assistant Examiner* — Monique M Wills
(74) *Attorney, Agent, or Firm* — Barley Snyder (57) ABSTRACT

A connector for connecting cells of a battery unit is disclosed. The connector comprises a carrier having weld openings, a cover covering the weld openings, a contact disposed in the carrier, a film connector disposed along an edge of the carrier, and a film conductor disposed in the carrier and contacting the contact and the film connector.

17 Claims, 9 Drawing Sheets

(51) Int. Cl.
  *H01M 50/24*   (2021.01)
  *H01M 50/271*  (2021.01)
  *H01M 50/227*  (2021.01)
  *H01M 50/209*  (2021.01)
  *H01M 50/503*  (2021.01)
  *H01M 50/516*  (2021.01)

(52) U.S. Cl.
  CPC ......... *H01M 50/24* (2021.01); *H01M 50/271* (2021.01); *H01M 50/503* (2021.01); *H01M 50/516* (2021.01); *H01M 2220/20* (2013.01)

(56) References Cited

U.S. PATENT DOCUMENTS

| | | | | |
|---|---|---|---|---|
| 2012/0208410 A1* | 8/2012 | Ikeda | ................. | H01M 10/425 439/883 |
| 2012/0251835 A1 | 10/2012 | Dry | | |
| 2012/0276431 A1* | 11/2012 | Groshert | ............ | H01M 50/502 174/126.1 |
| 2012/0328920 A1* | 12/2012 | Takase | ................ | H01M 2/1077 429/90 |
| 2013/0112551 A1* | 5/2013 | Fritz | ......................... | C25C 7/00 204/267 |
| 2013/0200700 A1 | 8/2013 | Ohkura et al. | | |
| 2014/0082938 A1* | 3/2014 | King, Jr. | ............ | H01R 13/5208 29/863 |

FOREIGN PATENT DOCUMENTS

| | | | | |
|---|---|---|---|---|
| CN | 203674293 | * | 6/2014 | ............. H01M 2/10 |
| DE | 10 2012 205 909 A1 | | 10/2013 | |
| DE | 102012205020 A1 | | 10/2013 | |
| EP | 2546906 A1 | | 1/2013 | |
| JP | 3821009 B2 | | 6/2006 | |
| JP | 2009176689 A | | 8/2009 | |
| JP | 2011210710 A | | 10/2011 | |
| JP | 2012109196 A | | 6/2012 | |
| JP | 2012243514 A | | 12/2012 | |
| JP | 2012243689 A | | 12/2012 | |
| JP | 2014010984 A | | 1/2014 | |

OTHER PUBLICATIONS

Merriam-Webster ("Pin" entry 1a, {https://www.merriam-webster.com/dictionary/pin} Waybackmachine on-internet evidence Apr. 25, 2009).*
Notice of Reasons for Refusal and English translation, dated Jan. 31, 2018, 8 pages.
Abstract JP 2012109196, dated Jun. 7, 2012, 2 pages.
PCT Notification, International Search Report and Written Opinion, dated Jun. 15, 2015, 11 pages.
Notice of Reasons for Refusal and English translation, dated Sep. 20, 2017, 15 pages.
Abstract of JP3821009, dated Jun. 30, 2006, 1 page.
Abstract of JP2014010984, dated Jan. 20, 2014, 1 page.
Abstract of JP2012243689, dated Dec. 10, 2012, 1 page.
Abstract of JP2009176689, dated Aug. 6, 2009, 1 page.
Korean Office Action and English Summary, dated Apr. 19, 2018, 12 pages.
Chinese First Office Action with English translation, dated Mar. 23, 2018, 19 pages.
Korean Office Action, dated Oct. 31, 2018, 7 pages.
Chinese Second Office Action with English translation, dated Oct. 19, 2018, 19 pages.
European Patent Office Communication, European Patent Application No. 15 710 519.8, dated Mar. 27, 2019, 5 pages.
Abstract of DE 102012205020 A1, dated Oct. 2, 2013, 1 page.
Chinese Third Office Action with English translation, Chinese Patent Application No. 201580015436.0, dated May 7, 2019, 8 pages.

* cited by examiner

CONNECTOR FOR CONNECTING CELLULAR ELECTRICAL ELEMENTS AND METHOD FOR INSTALLING SUCH A CONNECTOR ON A BATTERY UNIT

CROSS-REFERENCE TO RELATED APPLICATIONS

This application is a continuation of PCT International Application No. PCT/EP2015/055743, filed on Mar. 19, 2015, which claims priority under 35 U.S.C. §119 to German Patent Application No. 10 2014 205 465.6, filed on Mar. 24, 2014.

FIELD OF THE INVENTION

The present invention relates to a connector, and more particularly, to a connector for connecting cellular electrical elements and a method for installing such a connector.

BACKGROUND

It is known to interconnect cells of a traction battery of an electric vehicle, the cells comprising voltage sources and/or sinks which are constructed as galvanic cells, capacitors, or supercapacitors, in order to achieve high voltages and/or high capacitances. Voltage sources in such a battery may act at the same time as voltage sinks in order to repeatedly supply and remove electrical energy.

In the prior art, differently constructed housings are produced for each application involving various numbers of cells connected together by conductive connection components. Each of these housings is closed with a lid after the cells have been connected. Since each housing must be constructed individually and corresponding tool components must be prepared, these prior art housings require a high level of production and construction complexity. In another prior art solution, individual cells are connected by a manually arranged conductive connection component. This prior art solution, however, also leads to a high level of production complexity.

SUMMARY

An object of the invention, among others, is to provide a connector for connecting cells of a battery unit which is less complex and therefore more cost-effective. The disclosed connector comprises a carrier having weld openings, a cover covering the weld openings, a contact disposed in the carrier, a film connector disposed along an edge of the carrier, and a film conductor disposed in the carrier and contacting the contact and the film connector.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of a connector. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
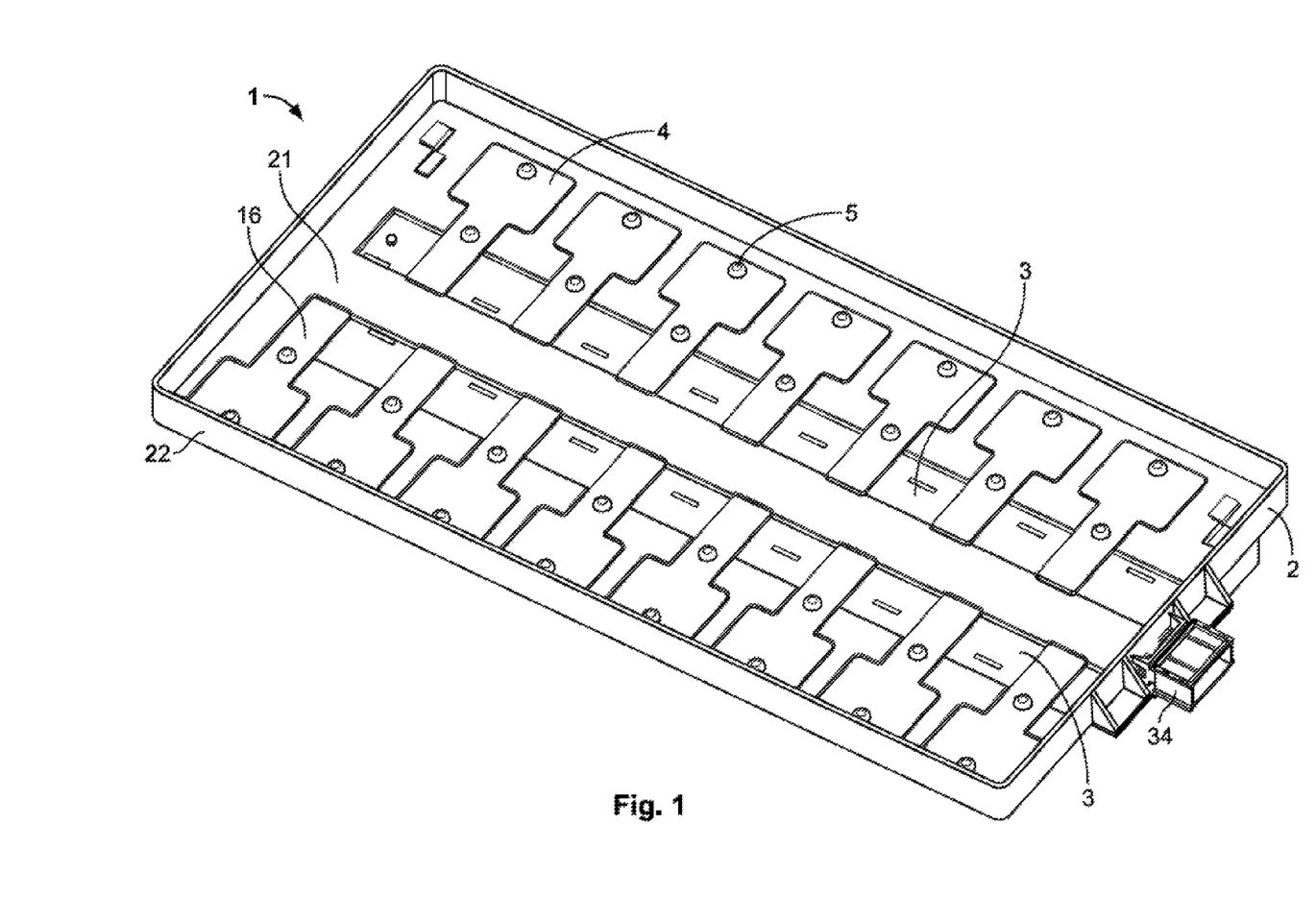
FIG. 1 is a perspective view of a connector according to an embodiment of the invention.
Figure 2:
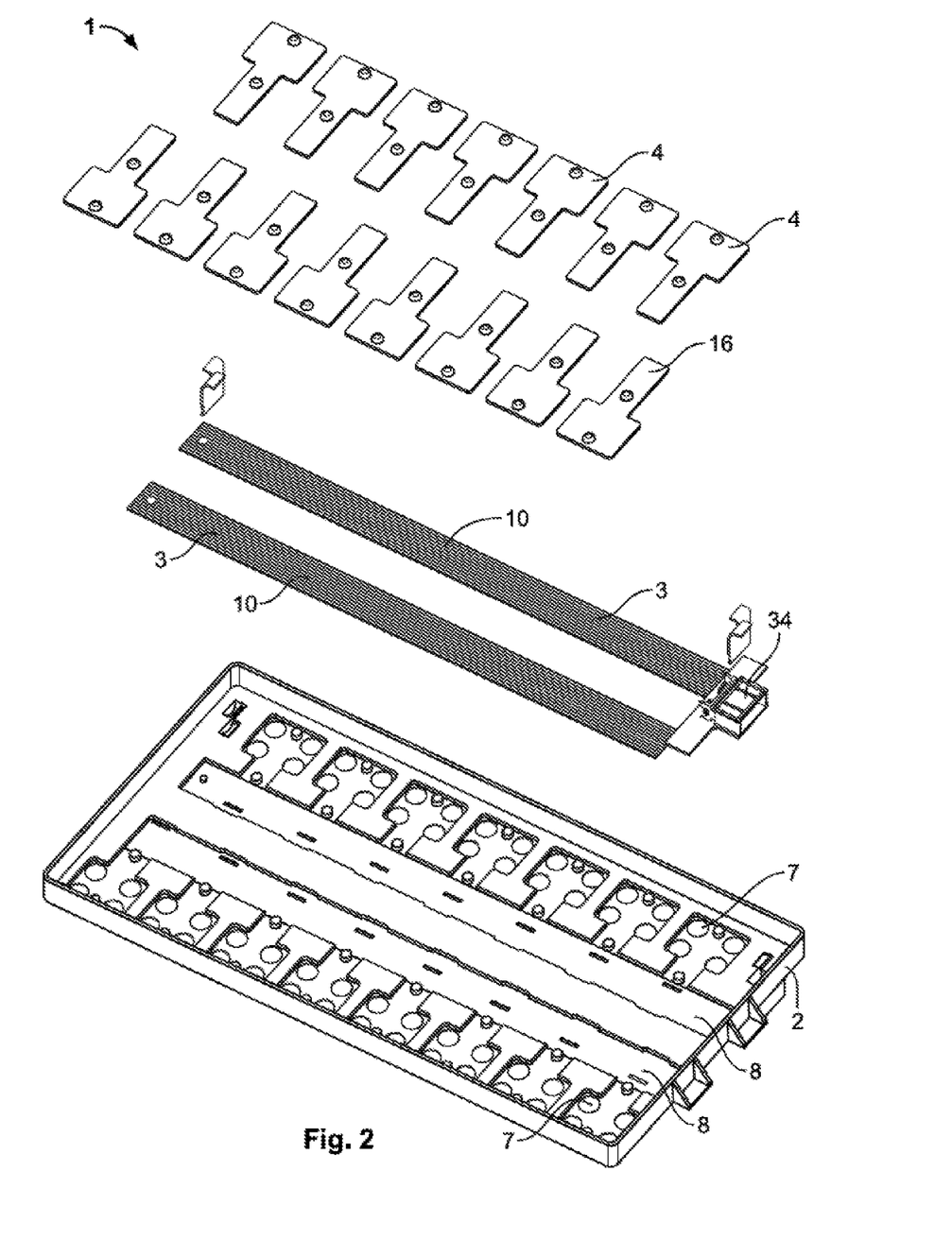
FIG. 2 is an exploded view of the connector of FIG. 1.

A connector 1 according to the invention is shown generally in FIGS. 1 and 2. The connector 1 has a carrier 2, a retainer 3, and a plurality of contacts 4.

The carrier 2, as shown in FIG. 1, has an elongated base plate 21 with a peripheral edge 22. The carrier 2 may be formed by injection-molding. The carrier 2 also has pins 5, weld openings 7, and receiving members 8. The pins 5 shown in FIG. 1 extend from the carrier 2. The carrier 2 has two rows of weld openings 7 extending through the carrier 2 as shown in FIG. 2. The weld openings 7 may be present on the carrier 2 or, for example, be cut from the carrier 2 by means of cutting or punching. Within each row, the weld openings 7 are arranged one behind the other in a regular manner and with the same spacing in a longitudinal direction of the carrier 2. In the shown embodiment, the receiving members 8 are positioned centrally and also extend in a longitudinal direction of the carrier 2.

The retainer 3, as shown in FIG. 2, has two parallel electrical film conductors 10 embedded in the retainer 3. The electrical film conductors 10 may be flat-ribbon cables or flat-ribbon lines also called FFC (flat flex cable). These film conductors 10 are connected at one end to contacts of a film connector 34. It is also possible to provide only one film conductor 10. The retainer 3 may be a separated portion of a strip material, for example, a portion of a strip material unrolled from a supply roll.

The contacts 4, in the embodiment shown in FIG. 2, are plate-like elements each having a tongue 16. The contacts 4 may be formed by means of punching and/or stamping from a metal sheet.

The carrier 2 and the retainer 3 may each be formed from a thermoplastic material, for example, a thermoplastic plastics material. In an alternative embodiment, the carrier 2 or the retainer 3 may also comprise another material, for example, a thermosetting material or another insulating material. The contacts 4 are formed of an electrically conductive material in order to enable good contacting.

The assembly of the connector 1 will now be described in greater detail with reference to FIGS. 1 and 2.

The retainer 3 is inserted with the film connector 34 into the receiving members 8 and retained in the carrier 2. The film connector 34, as shown in FIG. 1, is disposed along an edge of the carrier 2. The electrical film conductors 10 extend in a longitudinal direction of the connector 1. Subsequently, the contacts 4 are disposed in the carrier 2, placed onto the pins 5 and then positively-locked to the carrier 2 such that the contacts 4 are retained in the carrier 2. In the shown embodiment, the plurality of contacts 4 are arranged in two parallel rows. The connector 1 is therefore constructed in a sandwich-like manner, the contacts 4 being arranged and retained parallel with a position formed by the retainer 3 and a position formed by the carrier 2.

As would be understood by one with ordinary skill in the art, in place of the pins 5, it would also be possible to provide receiving members for receiving the contacts 4. The pins 5 may be formed by means of hot-caulking in order to secure the contacts 4.

The retainer 3 may comprise a hot-melt adhesive material which, when thermally processed, connects at least partially to the carrier 2 and the contacts 4 in a materially engaging manner. In alternative embodiments, the retainer 3 may be adhesively bonded to the carrier 2 and/or the contacts 4. The retainer 3 may thus mechanically and electrically connect the contacts 4. However, it is also possible for the retainer 3 to be used only for electrical contacting, and for the retention function to be taken over by the carrier 2.

The electrical film conductors 10 extend in parallel between the two rows of contacts 4 in the receiving members 8 in the carrier 2. A tongue 16 of each contact 4 protrudes into a conductor region of the retainer 3, and each tongue 16 is connected to one of the electrical film conductors 10. Each of the electrical film conductors 10 thus has a first side in electrical contact with a plurality of contacts 4 and a second side in contact with the film connector 34. The film connector 34 may be used to measure the voltage at the individual contacts 4. Each electrical film conductor 10 is insulated from the other electrical film conductor 10 by the insulating material of the retainer 3 since the electrical film conductors 10 are embedded in the retainer 3.

The tongues 16 each extend between two adjacent weld openings 7 on the carrier 2. A construction which is compact in the longitudinal direction of the connecter 1 is thereby ensured. The tongues 16 extend perpendicularly to the longitudinal direction of the electrical connector 1.

Figure 3:
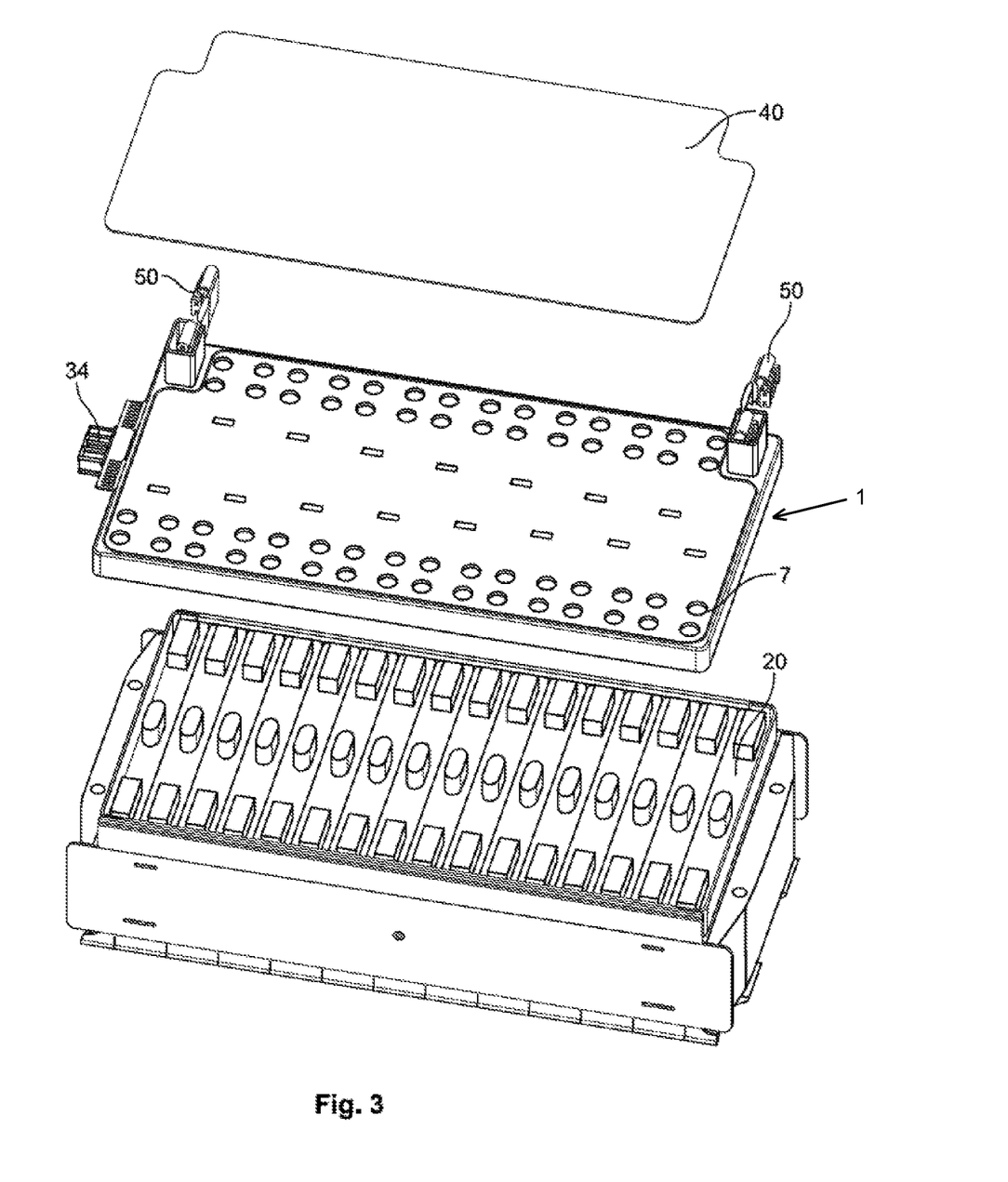
FIG. 3 is an exploded view of the connector of FIG. 1, a battery unit, and a cover.

The use of the connector 1 will now be described with reference to FIG. 3. The connector 1 is shown in FIG. 3 along with a plurality of battery cells 20, a cover 40, and a plurality of battery connectors 50. FIG. 1 shows a side of the connector 1 which is mounted on the plurality of battery cells 20, and FIG. 3 shows an orientation of the connector 1 viewed from a side opposite the side mounted on the plurality of battery cells 20.

The contacts 4, when the connector 1 is fitted on the plurality of battery cells 20 without a cover 40, are at least partially visible through the weld openings 7. Because the weld openings 7 are arranged with the same spacing in the longitudinal direction, it is thereby possible to contact the plurality of cells 20 which are arranged one behind the other in a row to the plurality of contacts 4. Through the weld openings 7, a welding device can electrically contact a contact 4 and press the contact 4 onto a counter-element of the plurality of cells 20. The contacts 4 may thus be welded onto corresponding counter-elements of the plurality of cells 20. Depending on the application, it may also be unnecessary to weld the contacts 4 to the cells 20.

The cover 40, as shown in FIG. 3, covers the weld openings 7 in the carrier 2 and is disposed on a side of the carrier 2 facing away from the contacts 4. The cover 40 is used for electrical insulation, for contact safety, and provides mechanical protection of the weld locations. The cover 40 may further be used for fitting tracing elements, such as codes, a date clock, and the like. The necessary insulation and protection from contact are thereby brought about. The cover 40 may be coated with an adhesive, and the cover 40 may be adhesively bonded to the carrier 2. The cover 40 may also be a film, such as a self-restoring film, providing protection against mechanical stresses.

The plurality of battery unit connectors 50 are attached to the connector 1 and used for connecting to adjacent battery units.

A connector 101 according to another embodiment of the invention is shown in FIGS. 4-9.

Figure 4:
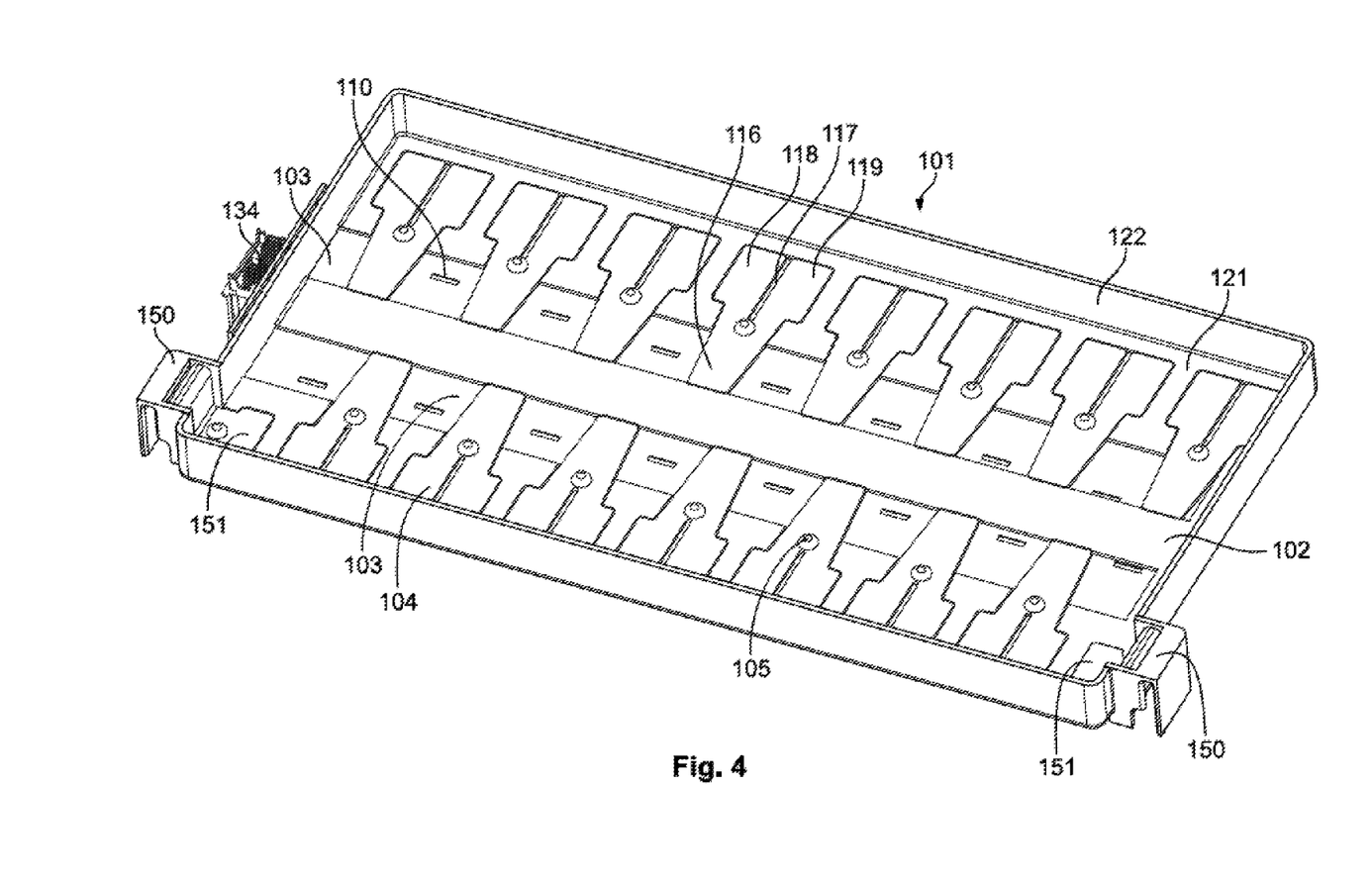
FIG. 4 is a perspective view of a connector according to another embodiment of the invention.
Figure 5:
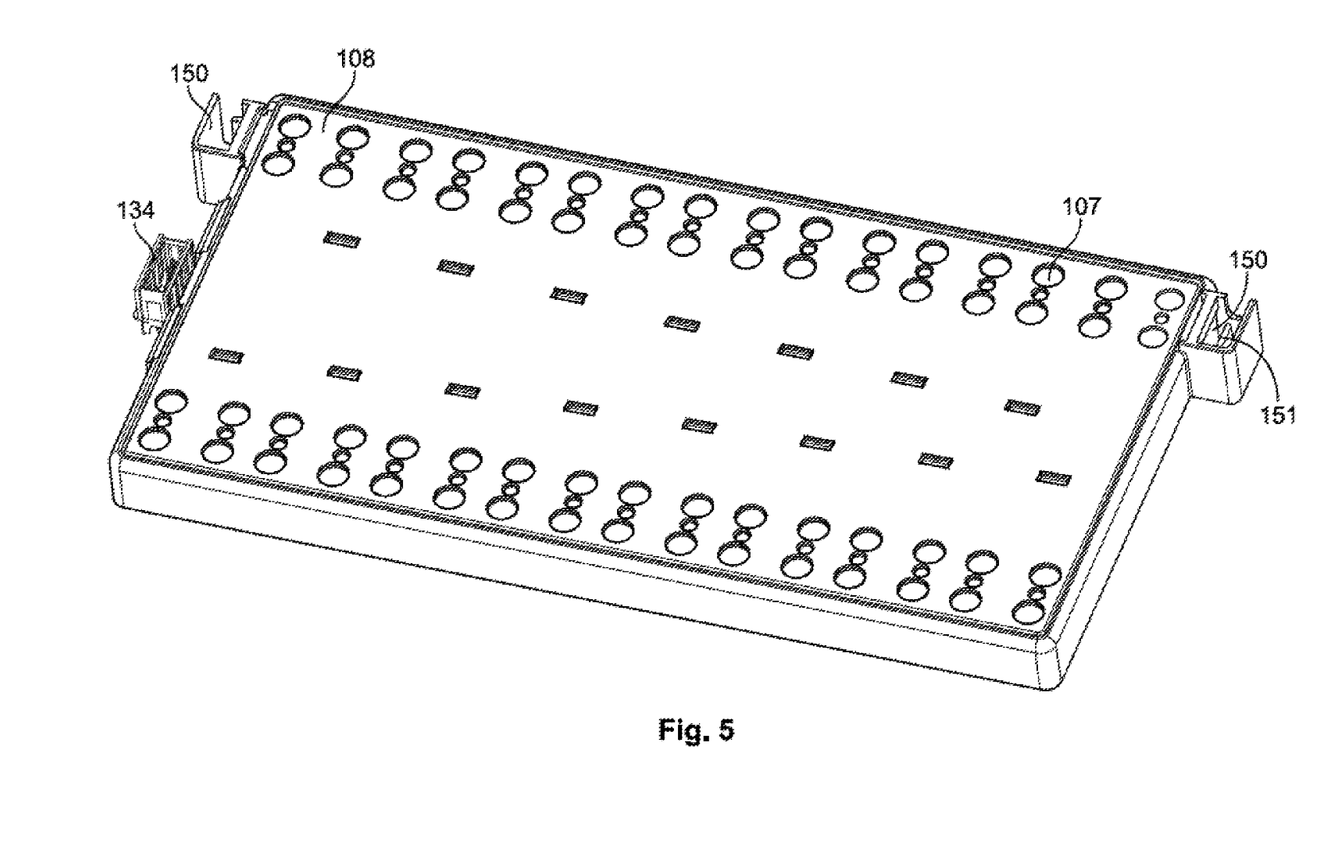
FIG. 5 is a perspective view of the connector of FIG. 4.
Figure 6:
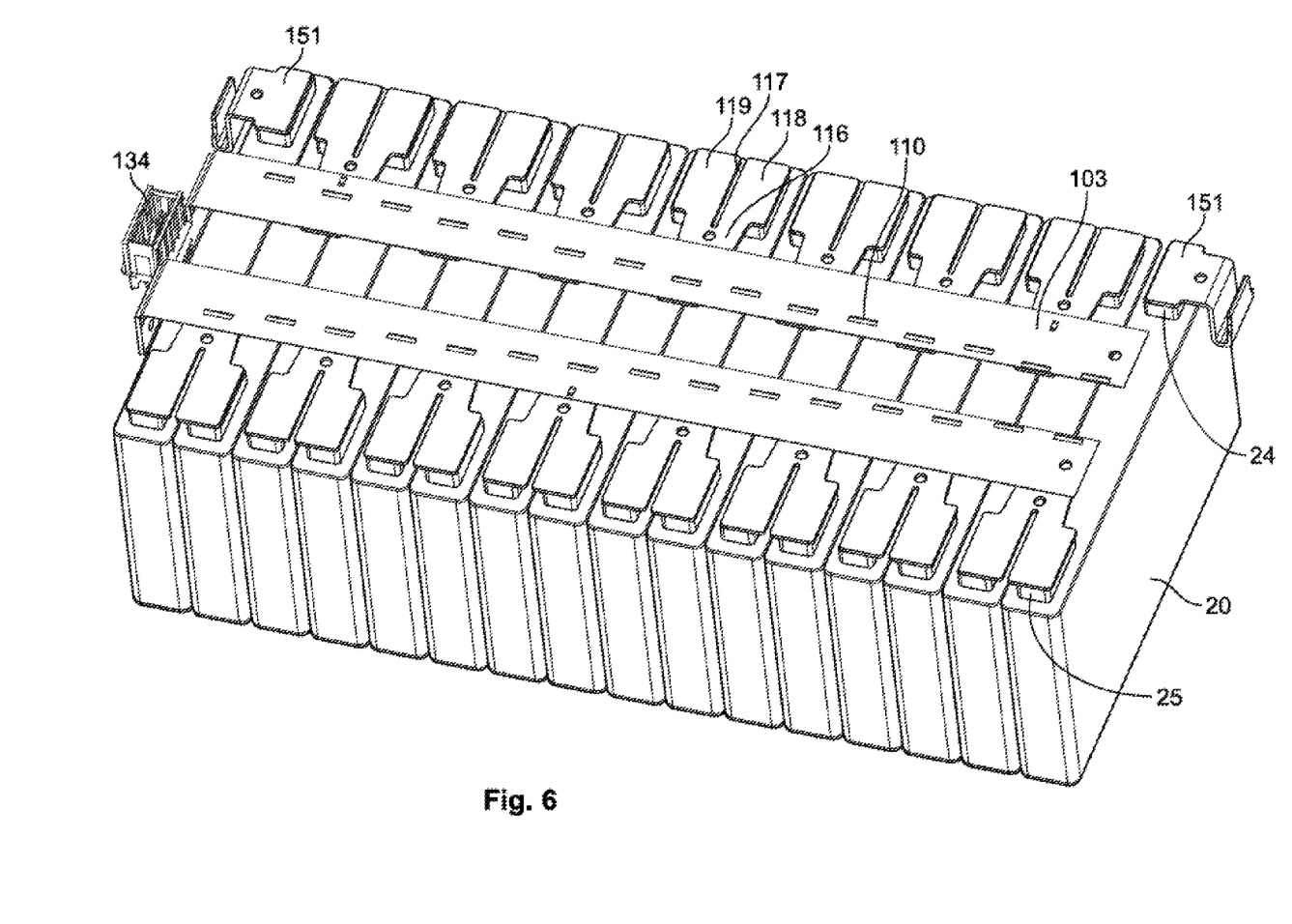
FIG. 6 is a perspective view of contacts and film conductors of the connector of FIG. 4 and a battery unit.
Figure 7:
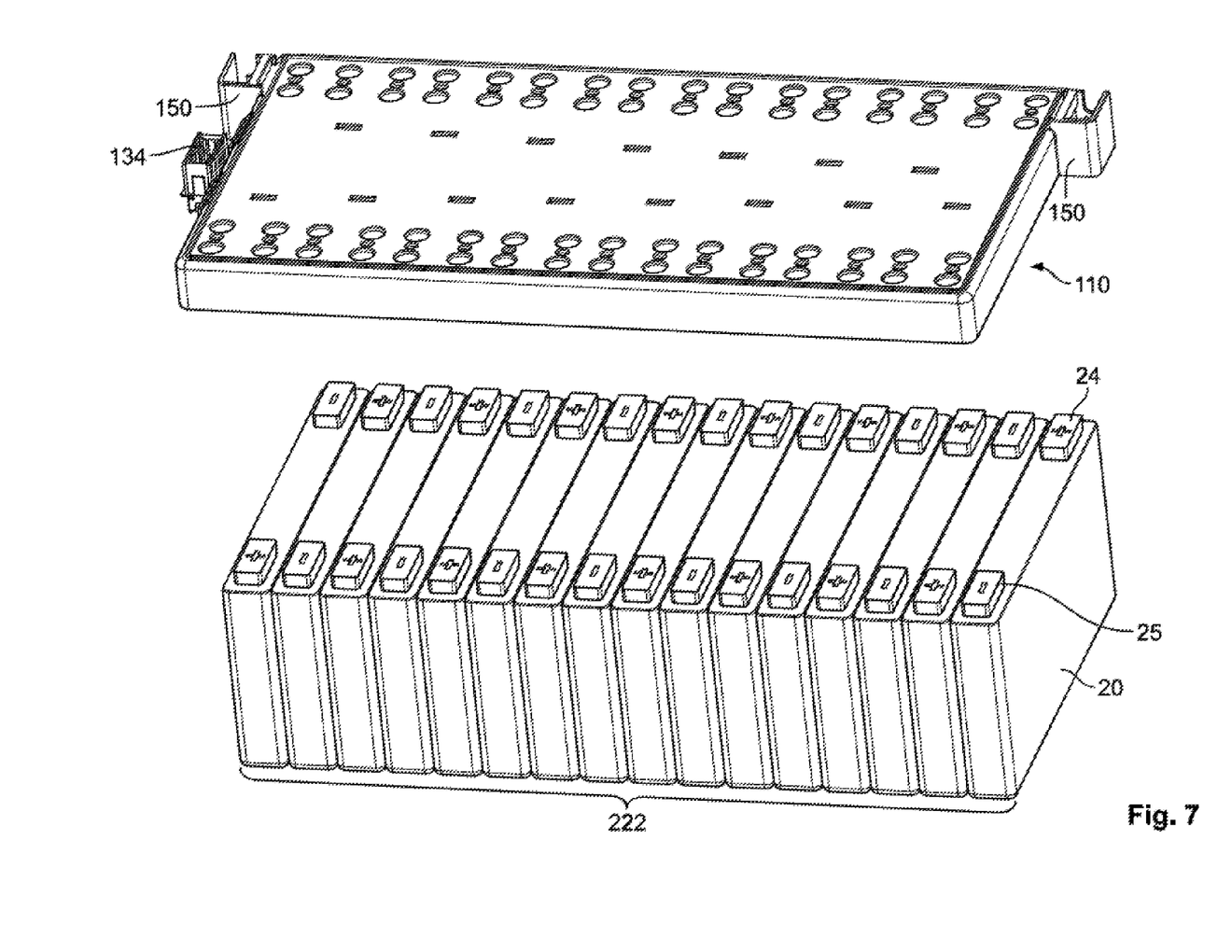
FIG. 7 is an exploded view of the connector of FIG. 4 and the battery unit.

FIG. 4 is a top view of the connector 101 for connecting a plurality of cells 20, shown in FIGS. 6 and 7, from the side which is mounted on a battery unit 222, without any cover. The connector 101, similarly to the connector 1 described with reference to FIGS. 1-3 above, has a carrier 102 having an elongated base plate 121 with a peripheral edge 122, a plurality of contacts 104 in two parallel rows, pins 105 for securing the contacts 104, two parallel retainers 103 having film conductors 110, and a connector element 134. It is further possible to see a plurality of battery unit connectors 150 for connecting a battery unit 222, shown in FIG. 7, to an adjacent battery unit. The battery unit connectors 150 are constructed so as to be safe from contact.

The connector 101 is distinguished in particular by the contacts 104. The contacts 104 shown are also plate-like. The contacts 104 each have a tongue 116 which protrudes into a conductor region of the retainer 103. The tongue 116 faces a bundle of film conductors 110. Each one of the film conductors 110 of the bundle is connected to a tongue 116 of a contact 104. The tongues 116 each extend between two adjacent weld openings 107 of a row 108 of weld openings 107 on the carrier 102.

Figure 8:
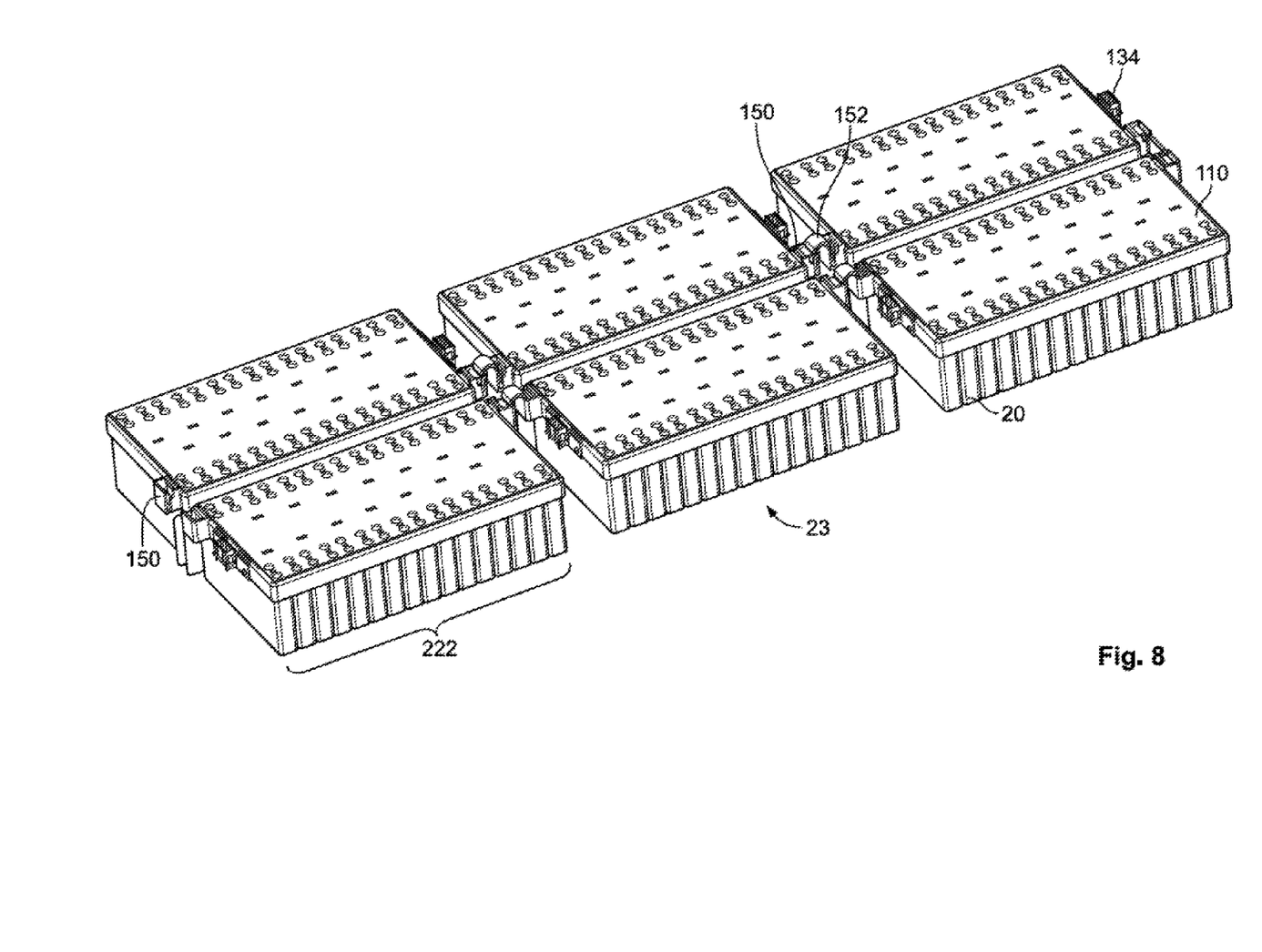
FIG. 8 is a perspective view of a plurality of connectors of FIG. 4 and a plurality of battery units.

The contact 104 is a cell connector for connecting two adjacent cells 20 of a battery unit 222. The cells 20 are voltage sources and/or sinks in the form of galvanic cells which are part of a traction battery 23, as shown in FIG. 8, which may be found, for example, in electrically driven vehicles for recurring removal and storage of electrical energy. The cells 20 each have an anode 24 and a cathode 25 as shown in FIG. 7.

As shown in FIG. 6, the contact 104 is provided with a slot 117 which extends between and separates two regions 118 and 119 of the contact 104 which each contact one of two adjacent cells 20. This slot 117 brings about a tolerance compensation which can compensate, on the one hand, for tolerances between the position of the adjacent cells 20 and, on the other hand, for tolerances which are produced by a different temperature path. In each of the regions 118, 119 the welding is carried out (through at least one weld opening 107) with a contact of a cell 20; in the central region of the electrical connector 101, a contact 104 has a region 118 contacting the anode 24 of a first galvanic cell 20 and a region 119 contacting the cathode 25 of a second adjacent galvanic cell 20. As shown in FIGS. 6 and 7, the contact 104 which is adjacent in the connector 101 then connects the anode 24 of a third galvanic cell 20 to the cathode 25 of a fourth galvanic cell 20, and so on. Two contact locations of each contact 4 which are located one behind the other in a transverse direction (in accordance with two weld openings 107 in the two parallel rows 108) each contact a single electrode of a galvanic cell 20. The two contact locations which follow in the longitudinal direction of the electrical connector 101 are arranged on the next galvanic cell 20, in this instance again on a single electrode.

Figure 9:
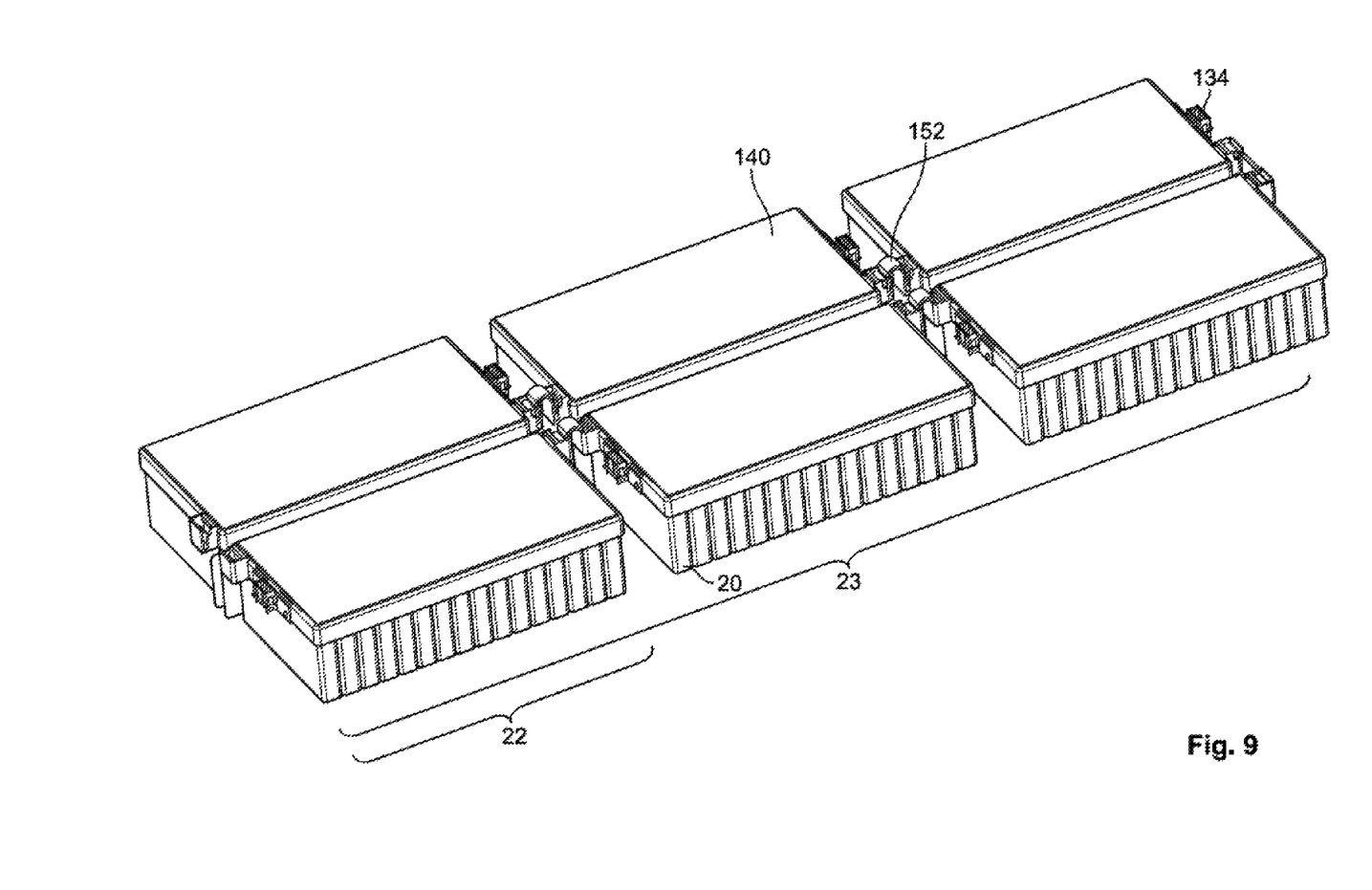
FIG. 9 is a perspective view of a plurality of connectors of FIG. 4, a plurality of battery units, and a plurality of covers.

FIG. 4 also shows a link 151 of the battery unit connectors 150 which accordingly connects the outer electrodes. The link 151 of the battery unit connectors 150 which are arranged at opposing ends are in contact only with a single electrode of a galvanic cell 20. They protrude beyond the remainder of the battery unit 222. The link 151 of the battery unit connectors 150 serves to connect a battery unit 222 to an adjacent battery unit 222 by an interconnector 152, as shown in FIGS. 8 and 9, forming a traction battery 23. On the whole, therefore, the cells 20 are connected to each other in series so that the voltages of the galvanic cells 20 are totaled. Therefore, the contacts 104 act in this instance as cell connectors which connect the galvanic cells 20 to each other.

The electrical film conductors 110 are each connected to a contact 104 so that the voltage present at this contact 104 can be constantly monitored. To control the voltage at each contact 104 individually, the electrical film conductors 110 are contacted individually, for example, at an end of each film conductor 101, with the plug type connector 134. Each contact 4 is therefore electrically connected to a film conductor 110.

In an alternative embodiment, all the anodes 24 and cathodes 25 of the cellular elements 20 can be arranged in a single row one behind the other in a linear manner. A single connector 101 may then be sufficient in order to produce a continuous current path. In this instance, a first contact 104 connects an anode 24 of a first cell 20 to a cathode 25 of a second cell 20. The contact 104 adjacent in the connector 101 then connects the anode 24 of the second cell 20 to the cathode 25 of a third cell 20, and so on.

In the embodiments described above, the use of the connectors 1, 101 on galvanic cells 20 is illustrated purely by way of example. As would be understood by one with ordinary skill in the art, the connectors 1, 101 could also be used on other cells, such as on capacitors or supercapacitors.

Advantageously, the connectors 1, 101 of the present invention are more simple and cost-effective to produce. The carrier 2 can be produced more simply with the cover 40 than a housing having a cover. Furthermore, the contact 4 is arranged in the carrier 2 to enable simple contacting with a cell 20, and can connect two cells 20 in parallel or in series such that the cells 20 do not have to be connected individually. Additionally, the separation of the retainer 3 from a longer roll enables high flexibility in terms of production; if a larger number of cells 20 elements are intended to be connected, longer retainer 3 pieces are separated and accordingly more contacts 4 are used.

What is claimed is:

1. A connector for connecting cells of a battery unit, comprising:
   a carrier including:
      a base plate having a plurality of weld openings extending through the carrier; and
      a peripheral edge extending away from the base plate and defining a battery unit opening for receiving the battery unit;
   a cover covering the plurality of weld openings, the cover is located on an opposite face of the battery unit opening;
   a plurality of contacts disposed on a side of the carrier and arranged in parallel rows, each contact is plate-like and contacts two adjacent cells, each contact having a tongue which extends between two adjacent weld openings;
   a film connector disposed along an edge of the carrier; and
   a film conductor disposed in the carrier and each tongue overlapping the film conductor, the film conductor contacting each contact along each tongue and the film connector.

2. The connector of claim 1, wherein the cover is a film.

3. The connector of claim 2, wherein the cover is a self-restoring film.

4. The connector of claim 1, wherein the cover is coated with an adhesive.

5. The connector of claim 4, wherein the cover is bonded to the carrier.

6. The connector of claim 1, wherein the cover is disposed on a side of the carrier facing away from the contact.

7. The connector of claim 1, wherein the contact and the film conductor are retained in the carrier and within the battery unit opening.

8. The connector of claim 1, wherein the film conductor is embedded in a retainer.

9. The connector of claim 8, wherein the retainer has a plurality of film conductors each with a first side contacting a contact and an opposite second side contacting the film connector.

10. The connector of claim 9, wherein the plurality of film conductors extend parallel with each other.

11. The connector of claim 1, wherein each contact has two regions each contacting one of the two adjacent cells.

12. The connector of claim 11, wherein the two regions are separated by a slot.

13. A method for installing a connector on a battery unit, comprising:
   providing a connector having a carrier with a plurality of weld openings extending through the carrier, a film conductor disposed in the carrier, a film connector disposed along an edge of the carrier, and a plurality of contacts disposed on and secured to a side of the carrier and arranged in parallel rows, each contact is plate-like and contacts two adjacent cells, each contact having a tongue which extends between two adjacent weld opening, the tongue overlapping the film conductor and contacting the film conductor and the film connector;
   placing the carrier on the battery unit with the plurality of contacts facing the battery unit, the plurality of contacts arranged within a battery unit space defined by a base plate and a peripheral edge of the carrier;
   welding the plurality of contacts to contact locations of a cell of the battery unit through the weld openings; and
   covering the weld openings with a cover located on an opposite face of a battery unit opening for receiving the battery unit.

14. The method of claim 13, wherein the cover is bonded to the carrier.

15. The connector of claim 1, wherein the base plate of the carrier defines a plurality of pins extending from the carrier, each of the contacts receives at least one of the pins for directly retaining the contacts in position within the carrier.

16. The connector of claim 1, wherein the film conductor is disposed between the carrier and the plurality of contacts.

17. The connector of claim 1, wherein the cover is disposed on a first side of the carrier and the contacts are disposed on a second side of the carrier opposite the first side.

* * * * *